United States Patent
Dong et al.

(10) Patent No.: US 10,116,665 B2
(45) Date of Patent: Oct. 30, 2018

(54) SECURED DISTRIBUTED COMPUTING ACROSS MULTIPLE FIREWALLS

(71) Applicant: The Boeing Company, Chicago, IL (US)

(72) Inventors: Jian Dong, Irvine, CA (US); Michael W. Pieknik, Summerville, SC (US); Joshua L. DeLong, Summerville, SC (US); Sean T. Johnson, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 233 days.

(21) Appl. No.: 14/958,017

(22) Filed: Dec. 3, 2015

(65) Prior Publication Data

US 2017/0163659 A1 Jun. 8, 2017

(51) Int. Cl.
G06F 7/04 (2006.01)
G06F 15/16 (2006.01)
G06F 17/30 (2006.01)
H04L 29/06 (2006.01)

(52) U.S. Cl.
CPC .......... *H04L 63/123* (2013.01); *H04L 63/102* (2013.01)

(58) Field of Classification Search
None
See application file for complete search history.

(56) References Cited

U.S. PATENT DOCUMENTS

2005/0204148 A1* 9/2005 Mayo ................ H04L 63/0815
713/185

2011/0302631 A1* 12/2011 Sureshchandra ....... G06F 21/34
726/4

FOREIGN PATENT DOCUMENTS

WO WO 2016054095 A1 * 4/2016 ........... H04L 67/141

OTHER PUBLICATIONS

Kao et al., "Business-To-Business Virtual Collaboration of Aircraft Engine Combustor Design", Proceedings of DETC '03, ASME 2003 Design Engineering Technical Conferences and Computers and Information in Engineering Conference, Sep. 2-6, 2003, pp. 1-9.

* cited by examiner

*Primary Examiner* — Kambiz Zand
*Assistant Examiner* — Arezoo Sherkat
(74) *Attorney, Agent, or Firm* — MH2 Technology Law Group LLP (57) ABSTRACT

This disclosure is directed to securely exchanging information between private domains. Methods and systems of the disclosure perform operations including providing a user identifier ("ID") and a first session ID to a user of a first private domain. The operations further include receiving from the user a service call for a first analytic service. Additionally, the operations include providing a service message for a second analytic service residing in a second private domain. Moreover, the operations include receiving a first verification message from the second private domain. The operations also include validating the first verification message. The operations further include providing a second verification message. Additionally, the operations include receiving a response message from the second private domain, the response message including information determined by the second analytic service based on job information in the service message.

23 Claims, 5 Drawing Sheets

| User ID 503 | Analytic Service ID 505 | Access Info. 507 | Certificate 509 |
|---|---|---|---|
| User A | Tool A | Read/Write | [Employee ID] |
| User A | Tool B | Read Only | [Nonce] |
| User B | Tool C | Read Only | [Nonce] |
| User B | Tool B | Read/Write | [Employee ID] |
| ... | | | |
| User X | | | |

| User ID 505 | Session ID 605 | Security ID 607 | Analytic Service ID 505 | Status Info. 611 | Originating Party ID 613 | Receiving Party ID 615 |
|---|---|---|---|---|---|---|
| User A | | | | | | |
| User B | | | | | | |
| ... | | | | | | |
| User X | | | | | | |

| User ID 505 | Session ID(s) 605 | Security ID 607 | Status Info. 611 | Originating Party ID 613 | Receiving Party ID 615 | Payload 705 | Timestamp 709 |
|---|---|---|---|---|---|---|---|

SECURED DISTRIBUTED COMPUTING ACROSS MULTIPLE FIREWALLS

GOVERNMENT INTEREST

This invention was made with Government support under contract FA8650-14-2-2532 awarded by Department of Defense. The Government has certain rights in this invention.

FIELD

The present disclosure generally relates to network security, and more particularly to securing distributed networks.

BACKGROUND

To reduce the time and cost of developing components for complex systems (e.g., aircraft), industries use distributed networks to perform simulation and analysis. These networks may use integrated and automated execution of applications that reside inside a number of separate network domains of different component developers. For example, an Original Equipment Manufacturer (OEM) may execute a multidisciplinary simulation and optimization that requires automated data transfer back and forth between applications residing inside different suppliers' firewalls. Securing distributed computing across firewalls has been a great challenge.

SUMMARY

The present disclosure directed for securely exchanging information between private domains in a distributed computing environment.

Methods and systems in accordance with the present disclosure perform operations including providing a user identifier ("ID") to a user of a first private domain of an information network. The operations also include providing to the user a first session ID. The operations further include receiving from the user a service call for a first analytic service residing in the first private domain, the service call including the user ID and the first session ID. Additionally, verifying the first session ID received in the service call and verifying the user ID received in the service call. Moreover, the operations include providing, via a public domain, a service message for a second analytic service residing in a second private domain. The service message including the user ID, the first session ID, and job information for the second analytic service. Further, the operations include receiving, via the public domain, a first verification message from the second private domain, the first verification message including the user ID, the first session ID, and a second session ID. The operations also include validating the user ID and the first session ID included in the first verification message. The operations further include providing, via the public domain, a second verification message, the second verification message including the user ID, the first session ID, and the second session ID. Additionally, the operations include receiving via the public domain, a response message from the second private domain, the response message including information determined by the second analytic service based on the job information in the service message.

Further, the present disclosure provides methods and system that perform operations including receiving by a computing device residing in a first private domain of an information network, via a public domain of the information network, a service message for a first analytic service residing in a first private domain of the information network. The service message can include a user ID, a first session ID, and job information for the first analytic service. The operations also include verifying the user ID by comparing the user ID to a pre-stored user ID in the first private domain. The operations further include generating a second session ID. Additionally, the operations include providing, via the public domain, a first verification message from a second private domain. The service message can include the user ID, the first session ID, and the second session ID. Moreover, the operations include receiving, via the public domain of the information network, a second verification message. The second verification message can include the user ID, the first session ID, and the second session ID. Further, the operations include verifying that the second session ID received in the second verification message matches the second session ID. Still further, the operations include storing first session ID. Still further, the operations include performing a second analytic service using the job information received in the service message. Still further, the operations include providing via the public domain, a response message from the first private domain. The response message can include information determined by the second analytic service based on the job information in the service message.

BRIEF DESCRIPTION OF THE DRAWINGS

The accompanying drawings, which are incorporated in and constitute a part of this specification, illustrate the present teachings and together with the description, serve to explain the principles of the disclosure.

It should be noted that some details of the figures have been simplified and are drawn to facilitate understanding of the present teachings, rather than to maintain strict structural accuracy, detail, and scale.

DETAILED DESCRIPTION

The present disclosure provides methods and systems that securely exchange information between private domains in a distributed computing environment. In accordance with embodiments of the present disclosure, the distributed computing environment can be an information system that includes two or more private network domains, each of which is communicatively linked across a public domain by a gateway. A user (e.g., an aeronautical engineer) of software services (e.g., a software tool that models an airframe) residing in a first private domain (e.g., a private computer network of an aircraft manufacturer) may perform integration testing for a system (e.g., an airframe) using a model for a component of the system (e.g., an engine) residing in a second private domain (e.g., a private computer network of propulsion system manufacturer). Each of the private domains may store information allowing it to authenticate the user, determine the user's access permissions, and verify whether an active session for the service exists in both the first private domain and the second private domain. After the user is authenticated and authorized, the user may call a first service (e.g., a simulation) in the first private domain that requires another service (e.g., a model) in the second private domain. Accordingly, the first service can generate a service message including all the information the second private domain may be required by the other service.

Advantageously, the methods and the systems disclosed herein provide security via multiple levels of authentication. Further, the methods and the systems allow for the creation and termination intermittent connections between the first private domain and the second private domain over extended periods of time, while still allowing remote services to remain active and information to be exchanged between the remote services, which is advantageous for long-running analysis jobs.

Some embodiments discussed herein are exemplified in terms of airplane and/or airline operations, including engineering, manufacturing, and design of aircraft. However, embodiments of the present disclosure are not limited to such implementations. For example, embodiments disclosed herein can be implemented in other industries, such as those that produce motor vehicles and commercial products. Additionally, embodiments disclosed herein can be applied to other fields, such as data analysis, cryptography, art, and gaming, that may use distributed computing.

Figure 1:
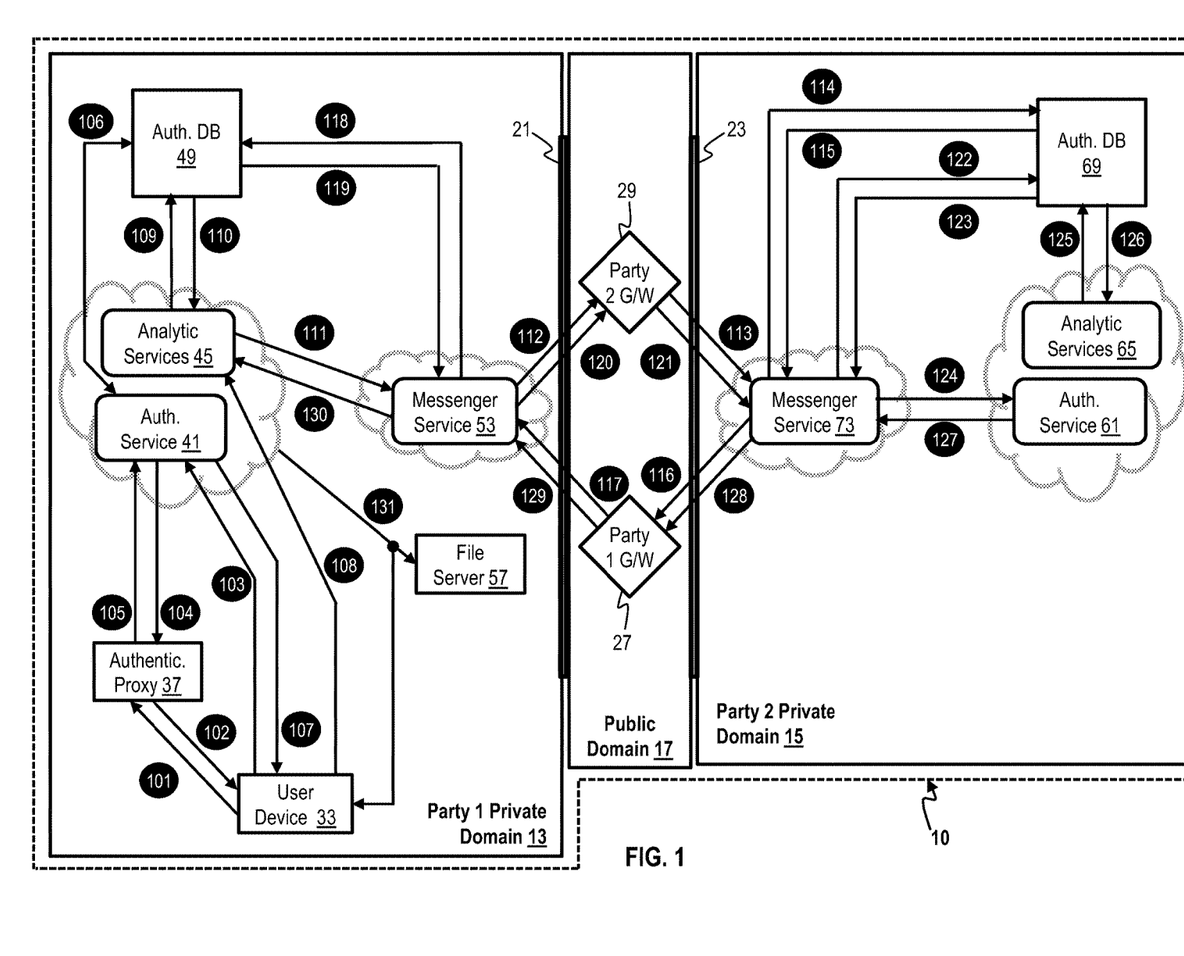
FIG. 1 illustrates a block diagram of an exemplary environment for implementing systems and processes in accordance with aspects of the disclosure.

FIG. 1 is an exemplary environment 10 for implementing methods and systems in accordance with aspects of the disclosure. The environment 10 comprises one or more computer networks segregated into a number of domains, including a private domain 13, a private domain 15, and a public domain 17. The public domain 17 can have components that are visible to (e.g., communicatively linked) to computing systems outside the environment 10 (e.g., the Internet or another network). The private domain 13 and the private domain 15 can include components and information that are substantially hidden from the public domain 17 by respective network firewalls 21 and 23. Gateway 27 of the private domain 13 and gateway 29 of the private domain 15 are exposed to the public domain 17 and permit information to pass through the respective firewalls 21 and 23 of the private domains 13 and 17. In this manner, both individually and in combination, each of the interconnected elements within private domain 13, the private domain 15, and public domain 17 can be an information network comprising environment 10.

In accordance with aspects of the present disclosure, the private domain 13 and the private domain 15 are operated by different parties. In some embodiments, the parties may be different entities, such as different companies or individuals. For example, the party operating private domain 13 can be a manufacturer of an aircraft airframe, and the party operating private domain 15 can be a provider of aircraft propulsion systems. Additionally, the first party and the second party may be different units within a single entity. For example, the first party operating private domain 13 can be a unit of an the aircraft manufacturer that develops aircraft mission computer software and the second party operating private domain 15 can be a separate unit of the business that provides electronic countermeasure systems, which may be used with the mission computer. While only two private domains 13 and 15 are shown in FIG. 1 for the sake of illustration, it is understood that the embodiments of environment 10 can have a greater number of private domains linked by one or more the public domains, which may be the same or similar to the public domain 17.

In accordance with aspects of the present disclosure, the private domain 13 includes at least one user device 33 operable by a user, an authentication proxy 37, an authorization service 41, one or more analytic services 45, an authorization database 49, a messenger service 53, and a file server 57. The user device 33 can be a personal computing device, such as a terminal, a personal computer, a laptop, or a portable communication device.

The authentication proxy 37 can be hardware, software, or a combination thereof that authenticates the user via the user device 33. In embodiments, the authentication proxy 37 is a server computer communicatively linked within the private domain 13 to the user device 33 and the authorization service 41. For example, the authentication proxy 37 can be a computing device that stores user login information (e.g., username and password) for comparison to credentials provided by the user.

The authorization service 41 can be hardware, software, or a combination thereof that verifies whether the user is authorized to access and/or modify one or more of the analytic services 45. In embodiments, the authorization service 41 is separate from and performs user-authorization operations independent of the authentication proxy 37 to enhance security. In embodiments, the authorization database 49 stores access control records associating particular users with one or more of the analytic services 45 they are permitted to accesses and/or modify. Additionally, the authorization database 49 can store session control records received from the authorization service 41 that associated the user and/or user device 33 with session information (e.g., the session ID and a corresponding tool in analytics services 45).

In some implementations, the authorization service 41 can be communicatively linked in the first private domain 13 to the authentication proxy 37, the authorization database 49, and the messenger service 53. In accordance with aspects of the present disclosure, the authorization service 41 interacts with the authorization database 49 to generate a security identifier ("ID") and a session ID. In some implementations, the security ID can be a cryptographic nonce or an encrypted user ID, which can be used as a security token for securing messages between the first domain 13 and the second domain 15 sent via the public domain 17. The session ID can be information identifying a particular session established between the private domain 13 and private domain 15 (e.g., job request or service call) executed by a particular one of the analytic services 45, and can be used to determine the status (e.g., active, active waiting, inactive waiting, and/or terminated) of the session. In embodiments, the security ID and the session ID are globally unique identifiers (i.e., "GUID").

The analytic services 45 can be hardware, software, or a combination thereof that provides one or more software tools that may be requested and/or executed by the user. In embodiments, the analytics services 45 are provided by the one or more server computers that also provide the authorization service 41. Each instance of a particular one of the analytics services 45 executed in response to a request by the user can be a session (e.g., job) that is associated with party's user ID and session ID. In embodiments, the analytic services 45 can model or simulate a system under test. For example, the analytic services 45 can include an aerodynamics model of an airframe for which the user is testing different propulsion system configurations.

The messenger service 53 can be hardware, software, or a combination thereof that communicates information between the private domain 13 and the public domain 17 across the firewalls 21 and 23 via gateways 27 and 29. In embodiments, the gateway 27 of the first private domain 13 resides on messenger services 53 and is exposed to the public domain 17 via the security ID, which can be used to ensure the communication is coming from a proper domain (e.g., a private domain 13), rather than a malefactor who has intercepted communications between the domains 13 and 15. For example, the security ID may be encrypted on the private domain 13 using a personal certificate (e.g., a key) previously provided by domain 15, and decrypted by a corresponding or equivalent certificate residing in domain 15 to verify the value of the security ID.

As noted above, the private domain 15 is a portion of the environment 10 that is separate from the private domain 13 and the public domain 17. In accordance with aspects of the present disclosure, the private domain 15 includes at least an authorization service 61, analytic services 65 (e.g., tools and applications), an authorization database 69, and a messenger service 73, which may be the same or similar to those previously discussed above. Additionally, while not shown for the sake of clarity, the private domain 15 can include a user device and an authentication proxy which are the same or similar to user device 33 and authentication proxy 37.

Still referring to FIG. 1, the environment 10 illustrates a functional flow of an exemplary process in accordance with the present disclosure. For reference and clarity, the functional flow is accompanied in FIG. 1 by the black circles, which are numbered (101) to (131). Initially, operators of the private domain 13 and the private domain 15 (i.e., the first party and the second party) can record information for one or more authorized users into the authorization databases 49 and 69. The information can include, among other things, user identifiers, operator information, (e.g., any identifier of the entities operating the private domains 13 and 15), access control information (e.g., tools, software, and/or services in analytic services 45, 65 the user is permitted to access), and certificates (e.g., keys) for encrypting/decrypting security IDs. The operators of the private domains 13 and 15 can (e.g., business entities, groups, or individuals) may mutually determine in advance particular users that are authorized to access certain analytic services 45 and 65. For example, each operator can provide a number of employees working on a particular research and development project that require particular tools within analytic services 45 and 65. The operators can pre-provision such information in access control records of the authorization databases 49 and 69.

At (101) a user logs into the user device 33 and submits a predetermined form of authentication information (e.g., a smart card, common access card, and/or username/password), which is provided from the user device 33 to the authentication proxy 37. The authentication proxy 37 validates the authentication information and, at (102), returns a user ID to the user device 33. The user ID can include identification information (e.g., a username) and a timestamp indicating a time at which the user ID was authenticated. In embodiments, the user ID is an encrypted globally unique identifier ("GUID").

At (103) the user device 33 provides the user ID to the authorization service 41, which at (104) immediately forwards the user ID to the authentication proxy 37. Based on the timestamp, the authentication proxy 37 determines whether the user ID passed from the authorization service 41 at (104) arrived within a predetermined amount of time after being provided to the user device 33 at (102). In some embodiments, the predetermined amount of time can be about two minutes to provide a high-level of security that user ID was not intercepted and/or tampered with by some malefactor. In some low-security embodiments, the predetermined amount of time can be about eight hours. If the authentication proxy 37 determines that the user ID was not received within the predetermined amount of time, then at (105) the authentication proxy 37 responds to the authorization service 41 with an indication that the user is not authenticated, and the process ends. On the other hand, if the authentication proxy 37 determines that the security ID arrived within the predetermined amount of time, then at (105) the authentication proxy 37 responds to the authorization service 41 with an authentication message indicating user is authenticated. This authentication message can also include the user ID.

If the user is authenticated at (105), then at (106) the authorization service 41 queries the authorization database 49 and determines whether the user is authorized to use some or all of the analytic services 45. For example, based on the user ID obtained at (105), the authorization service 41 can query access control records stored in the authorization database 49. Additionally, based on access control records corresponding to the user ID, the authorization service 41 may generate a session ID and a security ID for the user, and stores them in the authorization database 49 for future validation and/or verification of messages exchanged in association with the session. In accordance with aspects of the present disclosure, the session ID and a security ID serve as the user tokens for communication with and/or accessing analytic services 45 and 65. For example, as discussed previously, the security ID can be used to verify that a communication between private domains 12 and 15 is authentic. Further, the session ID can be used to validate whether or not the user can access a particular one of the analytic services 45 or 65, and validate that a session with the particular one of the analytic services 45 or 65 in is still active. Accordingly, at (107) the authorization service 41 provides the session ID and the security ID to the user device 33.

At (108) the user device 33 provides a service call to the analytic services 45, including the session ID and the security ID provided at (107). In embodiments, the service call comprises a Simple Object Access Protocol ("SOAP") envelope that contains all necessary information to perform a requested series of actions specified (e.g., by the user) for a particular job. The requested series of actions can be a single analysis or it can be multiple analyses included in a job. For example, if the result of a first service call to one of analytic services 45 requires further processing by a second service call to another of the analytic services 45, 65, the first service call (e.g., a SOAP envelope) can include data to for use by the other analytic service 45, 65 identified in the first service call, as well as the name of the first service to send the result data. As such, an entire analysis can be completed by passing information between analytic services 45, 65 in service calls and only return data to the user device 33 after a final result has been determined. Doing so avoids unnecessary delays resulting from returning information from, for example, private domain 15 to private domain 13.

At (109) the analytic services 45 validate the service call received at (108) by confirming with the authorization database 49 that that the session ID is active and that user identified in the security ID matches the information stored at (106). In embodiments, the analytic services 45 can also use the security ID to verify that the user made the request and to determine that user is authorized to use the requested analytic services 45. At (110), if the session ID and security ID match those previously stored in the authorization database 45, and if it has been determined that the user is authorized to use the requested analytic services 45, then the requested analytic services 45 are permitted to perform the actions requested at (108).

In accordance with aspects of the present disclosure, the requested analytic services 45 residing in the private domain 13 may require services and/or information (e.g., from a remote tool or model) from analytic services 65 in private domain 15. In this situation, the analytic services 45 can obtain the information from the private domain 15 across the public domain 17. At (111), the analytic services 45 generate a service message and provide it to the messenger service 53. In embodiments, the service message can be a web service call, such as a SOAP envelope, including parameters identifying the user and the session. In embodiments, the service message includes, at least, the user ID, the security ID, and the session ID. Additionally, the service message can identify the operator of the private domain 13 (e.g., a first company), the operator of the private domain 15 (e.g., a second company). Further, the service message can include a job flag that indicates an active session is under execution. Moreover, the service message can include information for the requested analytic service 65, including data (e.g., an extensible markup language ("XML") structure having open ended format, an identifier of a next task in the job, and identifiers of remaining tasks in the job).

At (112) the messenger service 53 can encrypt the service message provided at (111) and securely send it (e.g., using Hyper Text Transfer Protocol Secure. "HTTPS") through the firewall 21 to the gateway 29 of the private domain 15. The gateway 29 validates the service message received at (112), and at (113) forwards to service message to the messenger service 73 of the private domain 15. At (114) the messenger service 73 unencrypts the service message received at (113) and validates the user's access to the analytic services 65 using the authorization database 69. For example, using the information pre-provisioned in the authorization database 69 prior to (101) by the first party and the second party, the messenger service 73 can lookup services and tools (e.g., one or more of analytic services 65) for which the user is authorized a same or similar manner to that previously described with respect to authorization database 49. Additionally, in some embodiments, the messenger service can use the operator information included in the service message to cross-reference it with a list of preapproved parties. At (115) the authorization database 69 can return an authorization for the user ID in the service message received at (113) envelope to the messenger service 73. Further, in embodiments, the security ID can be encrypted in the service message generated at (111) and decrypted at (114) using the pre-provisioned certifications (e.g., keys) to provide an added security.

If messenger service 73 verifies that the user is authorized to use the requested analytic services 65 based on the response received at (115) from the authorization database 69, then the messenger service 73 generates a second session ID. In embodiments, the second session ID is stored in the authorization database 69, along with a timestamp indicating the time it was generated. Additionally, the messenger service 73 generates a first verification message incorporating the second session ID. In embodiments, the first verification message is an encrypted SOAP envelop, similar to that previously described herein. The first verification message can include the user ID, the security ID, the first session ID, and the second session ID. Additionally, the first verification message can identify the operator of the private domain 13, and the operator of the private domain 15, which can be used to cross-reference with a list of preapproved parties, as previously discussed herein. Further, first verification message can include a timestamp indicating a time when it was created.

At (116) the messenger service 73 can encrypt the first verification message and provide it the gateway 27 of the domain 13 through the firewall 23 using the security ID provided by the private domain 13 on the gateway 27. At (117) the gateway 27 forwards the first verification message received at (116) to the messenger service 53 of the first domain through the firewall 21. Advantageously, the first verification message can be sent in a communication thread that is separate from the service message, which reduces the risk of a malefactor spoofing the process by, for example, a man-in-the-middle attack.

At (118), the messenger service 53 compares the user ID included in the first verification message received at (117) to the user ID and session ID previously stored in the authorization database 49 at (106). Additionally, the messenger service 53 can also validate the security ID. At (119) the authorization database 49 returns a response indicating whether the first verification message contains that original session ID for that user ID. Based on a response from the authorization database 49 indicating that the first session ID received at (117) was correct and that the session is active at (119), the messenger service 53 generates a second verification message and, at (120) provides it to the gateway 29 of the second domain 15 via the firewall 21. In embodiments, second verification message is provided in a separate thread than the service message and the first verification message. The second verification message includes the user ID, the security ID, the first session ID, and the second session ID. Additionally, the second verification message can identify the operator of the private domain 13, and the operator of the private domain 15. In embodiments, the second verification message can be a SOAP envelop, the same or similar to those previously described herein.

At (121), the gateway 29 forwards the second verification message received at (120) to the messenger service 73, which compares the second session ID value against the second session ID stored in the authorization database at (115). Additionally, the messenger service 73 can compare the incoming time to the timestamp created at (115). If the comparisons of (121) indicate that the second session ID matches and was received within a predetermined time window from being created, then at (122), the messenger service 73 stores the first session ID in the authorization database 69, which returns control back to messenger service 73 at (123).

At (124) the messenger service 73 provides the job information included in the service request received (112) to the analytics service 65 for processing. Assuming (101) to (123) have occurred within time interval started upon the return provided by domain 15, future calls from service 45 in private domain 13 that include the user ID and session ID can be directly executed by the analytic services 65 in private domain 15 without repeating (101)-(123). In accordance with aspects of the present disclosure, multiple interactions can happen immediately between the messenger services 53, 73 and the analytic services 45, 65.

At (125) and (126), each job executed by the analytic service 65 can be validated against the authorization database 69 using the session IDs and the security ID to ensure the user has permissions to execute a particular one of the analytic services 65 used in the current session. After information is processed by the analytic service 65, at (127), the analytic services 65 (e.g., for a task included in a service message) provided the information to the messenger service 73. The messenger service 73 will use both the analytic service ID and session ID to generate a response message including the information produced by the analytic service 65. In embodiments, the response message is a SOAP envelop, which may be the same or similar to those previously discussed herein. At (128) the messenger service 73 provides the response message to the messenger service 53 via firewall 23, the gateway 27. At (129) the gateway 27 forwards the response message to the messenger service 53. At (130) and (131), the response message received at 29 can be passed to the analytics services 45 and/or stored in the file server 57.

Figure 2:
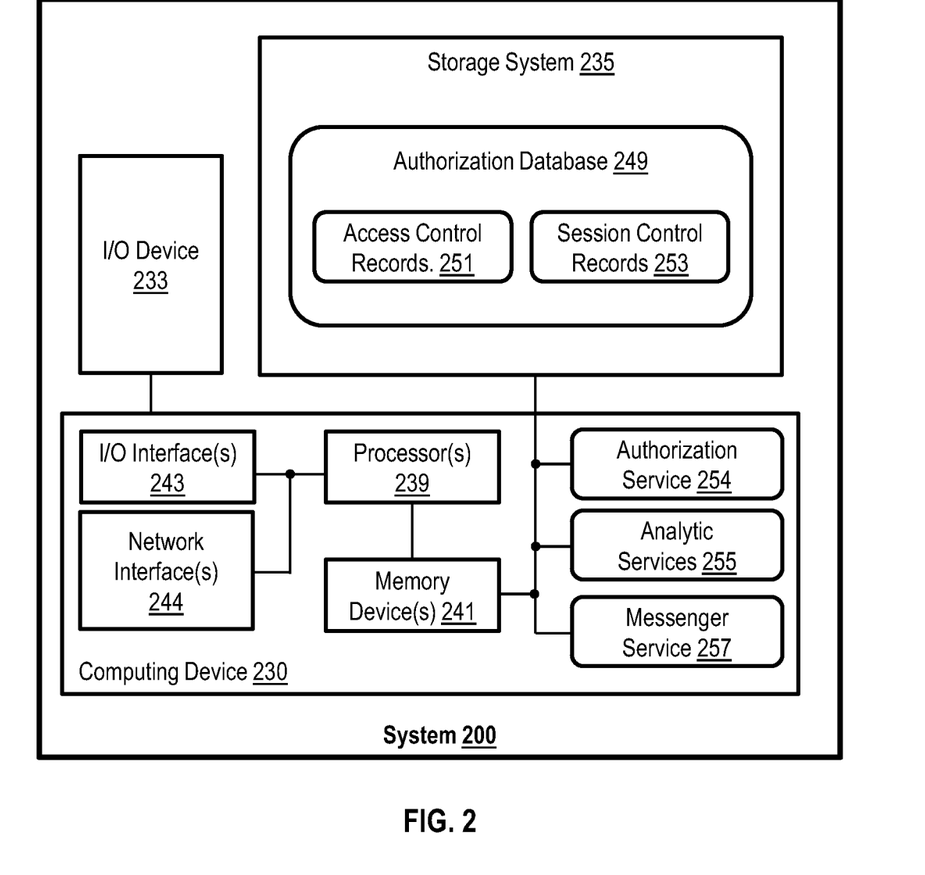
FIG. 2 illustrates a block diagram of an exemplary system in accordance with aspects of the present disclosure.

FIG. 2 illustrates a block diagram of a system 200 in accordance with aspects of the present disclosure. The system 200 includes hardware and software that perform processes and functions described herein. In particular, the system 200 can include at least one computing device 230, at least one input/output (I/O) device 233, and at least one storage system 235. The I/O device 233 can include any device that enables an individual (e.g., an end user and/or consumer) to interact with the system 200 (e.g., a user interface) and/or any device that enables the computing device 230 to communicate with one or more other computing devices and/or information networks using any type of communications link. The I/O device 233 can include, for example, a touchscreen display, pointer device, keyboard, etc.

The storage system 235 can comprise a computer-readable hardware storage device that stores information and program instructions. For example, the storage system 235 can be one or more flash drives and/or hard disk drives. In accordance with aspects of the present disclosure, the storage system 235 can include an authorization database 249, which can be the same or similar to those previously described herein (e.g., authorization databases 49 and 69). The authorization database 249 can store access control records 251, which associate particular users (e.g., the user of user device 33) with analytic services (e.g., analytic services 45 and 65) that the users are permitted to access and use. The authorization database 249 can also store session control records 253, which associate particular instantiations of an analytic service (e.g., analytic services 45 and 65) with information used to verify and/or authentic messages between domains (e.g., between private domain 13 and private domain 15). The information associated by each session control record can include a session ID, and a security ID.

In embodiments, the computing device 230 includes one or more processors 239 (e.g., microprocessor, microchip, or application-specific integrated circuit), one or more memory devices 241 (e.g., random access memory and read only memory), one or more I/O interfaces 243, and one or more network interfaces 244. The memory device 241 can include a local memory (e.g., a random access memory and a cache memory) employed during execution of program instructions. Additionally, the computing device 230 includes at least one communication channel (e.g., a data bus) by which it communicates with the I/O device 233, and the storage system 235. The processor 239 executes computer program instructions (e.g., an operating system and/or application programs), which can be stored in the memory device 241 and/or storage system 235. Moreover, the processor 239 can execute computer program instructions of authorization service 254, analytic services 255, and messenger service 257, which may be the same or similar to those previously discussed above (e.g., authorization services 41 and 62, analytic services 45 and 65, and messenger services 53 and 73).

It is noted that in some embodiments the computing device 230 can comprise any general-purpose computing article of manufacture capable of executing computer program instructions installed thereon (e.g., a personal computer, server, etc.). However, the computing device 230 is only representative of various possible equivalent-computing devices that can be configure by program instructions into a special-purpose machine that performs the processes and functions described herein. To this extent, in embodiments, the functionality provided by the computing device 130 can be any combination of general and/or specific purpose hardware and/or computer program instructions. In each embodiment, the program instructions and hardware can be created using standard programming and engineering techniques, respectively.

Additionally, while FIG. 2 illustrates the authorization service 254, the analytic service 255, and the messenger service 257 as included in a single system 200 for the sake of illustration, it is understood the one or more of these services can be implemented in a separate systems that are communicatively linked. For example, the authorization service 254 and the analytic services 255 and can be implemented in a first system, such as system 200, and the messenger service 257 can be implemented in a second such system.

Figure 3:
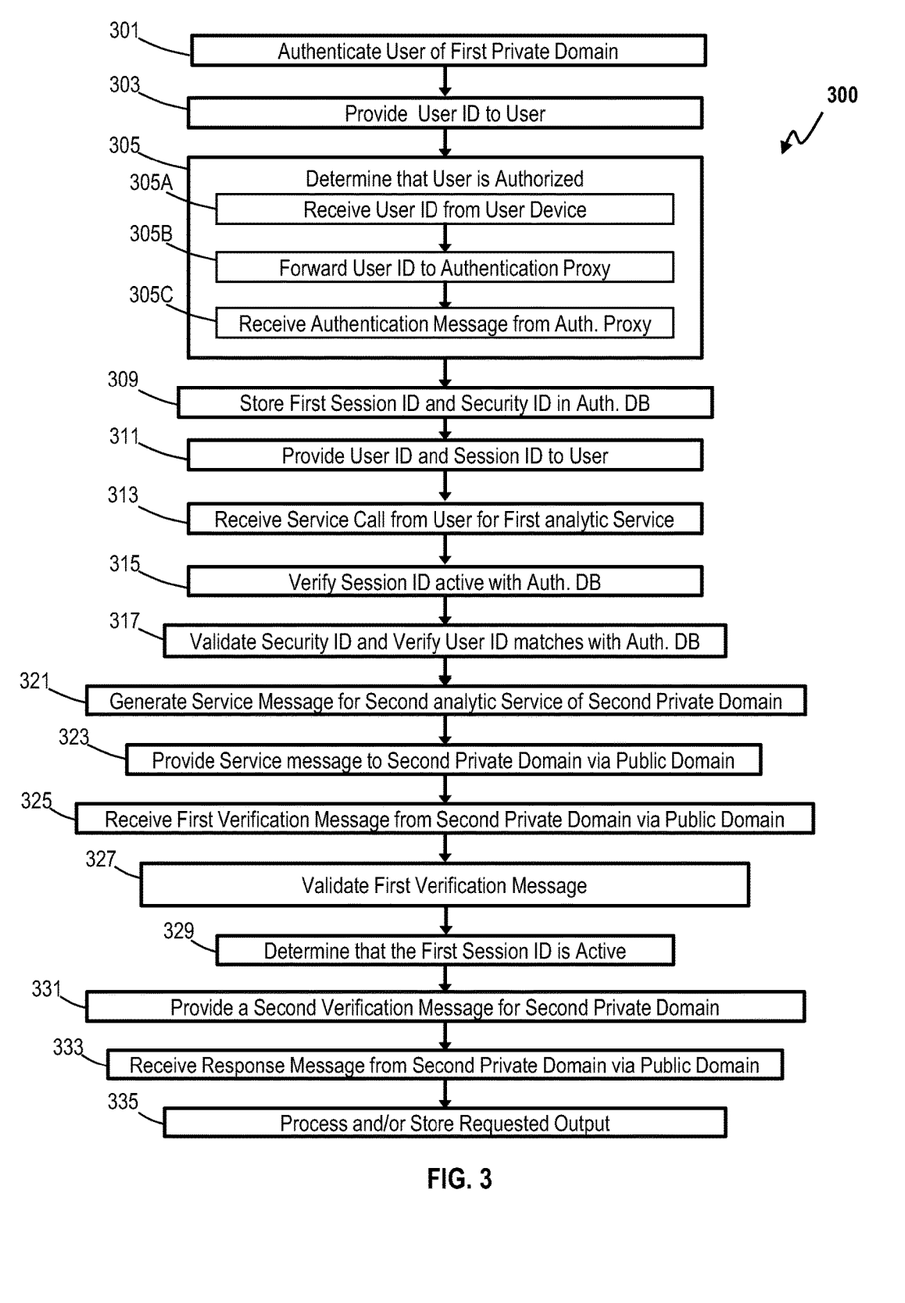
FIG. 3 illustrates a flow diagram of an exemplary process in accordance with aspects of the present disclosure.

FIG. 3 illustrates a flow diagram of an exemplary process 300 the may be performed by a local private domain (e.g., private domain 13) in accordance with aspects of the present disclosure. At 301, a computing device (e.g., computing device 230 executing authorization service 41) in a first private domain (e.g., private domain 13) of an information network (e.g., environment 10) authenticates a user via a user device (e.g., user device 33). Based on successfully authenticating the user at 301, the computing device generates a user ID at 303 and provides it to the user, as previously described herein. At 305, the computing device determines that the user is authorized to access analytic services (e.g., analytic services 45) residing in the first private domain using pre-stored authorization information (e.g., access control records 251 in authorization database 249), as previously described herein. Determining that the user is authorized can include receiving the user ID of the user from the user device, as indicated at 305A. Also, determining that the user is authorized can include forwarding the user ID to an authentication proxy (e.g., authentication proxy 37), as indicated at 305B. Further, determining that the user is authorized can include receiving an authentication message from the authentication proxy, including the user ID, as indicated at 305C.

At 309, based on a successfully authorizing the user at 305, the computing device generates a session control record (e.g., session control record 253) in the authorization database (e.g., authorization database 49), including first session ID, a security ID corresponding to the user, and a session status indicator (e.g., active, waiting, or terminated). Additionally, at 311, the computing device provides the security ID and the first session ID generated at 309 to the user via the user device.

At 313 the server receives a service call from the user via the user device for one or more of the analytic services in the first private domain. In accordance with aspects of the present disclosure, the service call of 313 is a message including the user ID and the session ID provided at 309. Additionally, for added security, the service call can include the security ID provided at 309. At 315, the computing device verifies the service call by determining that the first session ID is active by comparing the first session ID received from the user at 311 with the status indicator associated with the first session ID stored in the authorization database at 309. Additionally, at 317 the computing device can validate the security ID and verify that the user is authorized to use the analytic services by comparing the security ID received at 313 with the security ID stored in the authorization database at 309.

At 321, based on a successful verification at 315 and 317, the computing device generates a service message for a second analytic service (e.g., analytics service 65) in a second private domain (e.g., private domain 15). The service message can include the user ID, the security ID, the first session ID, and job information (requested services, tasks, data, and output) for the second analytic service. The service message can also include other information, such as that previously described herein (e.g., information identifying one or more of the operators of the private domains 13 and 15). At 323, the computing device provides the service message to the second private domain via a public domain. For example, the service message may be sent through a firewall (e.g., firewall 21) of the first private domain to a gateway exposed to the public domain by the second private domain. As described previously herein, the second private domain verifies the information in the second service and authorizes access to its analytic services (analytic services 65) in a manner that is the same or similar to that previously described herein (e.g., (14) and (15)).

Based on a successful authorization, the second private domain (e.g., via messenger service 73) generates a second session ID and stores the second session ID in a second control session record in a second authorization database (e.g., authorization database 65), along with the first session ID, and a security ID. At 325, based on a successful authorization of the service message sent at 323, the computing device receives a first verification message from the second private domain, via the public domain. In accordance with aspects of the present disclosure, the first verification message includes the user ID, the first session ID, and the second session ID. The first verification message can also include other information, such as that previously described herein (e.g., identification of one or more of the operators of the private domains). Additionally, the first verification message can include a timestamp indicating the time at which it was created. At 327, the computing device validates the first verification message received at 325. For example, the computing device can determine whether the user ID and the first session ID received at 325 matches the user ID and the first session ID previously stored in the authorization database at 309. Additionally, at 329 the computing devices determine that the first session ID is active based on the first session ID stored in the authorization database at 309.

At 331, based on successfully validating the user ID and the first session ID, and verifying that the first session ID is active at 327, the computing device generates and provides a second verification message. The second verification message can include the user ID, the first session ID, and the second session ID received from the second private domain at 325. The second verification message can also include other information, such as that previously described herein (e.g., the information identifying one or more of the operators of the private domains 13 and 15). In accordance with aspects of the present disclosure, the second private domain verifies the information included in the second verification message sent at 331.

At 333, in response to the second verification message sent at 331, the computing device receives a response message from the second private domain, via the public domain, including the information from the second analytic service residing the second provide domain requested by the job information in the service message sent at 323. At 335, the computing device processes the information received at 333 and/or stores the information in, for example, a file server (e.g., file server 57) for future use. While the exemplary process 300 illustrated in FIG. 3 and describe above includes a provides a response message at 333, it is understood that a particular job may include multiple iterations of the operations involved in 313 to 332 before a response message is provided.

Figure 4:
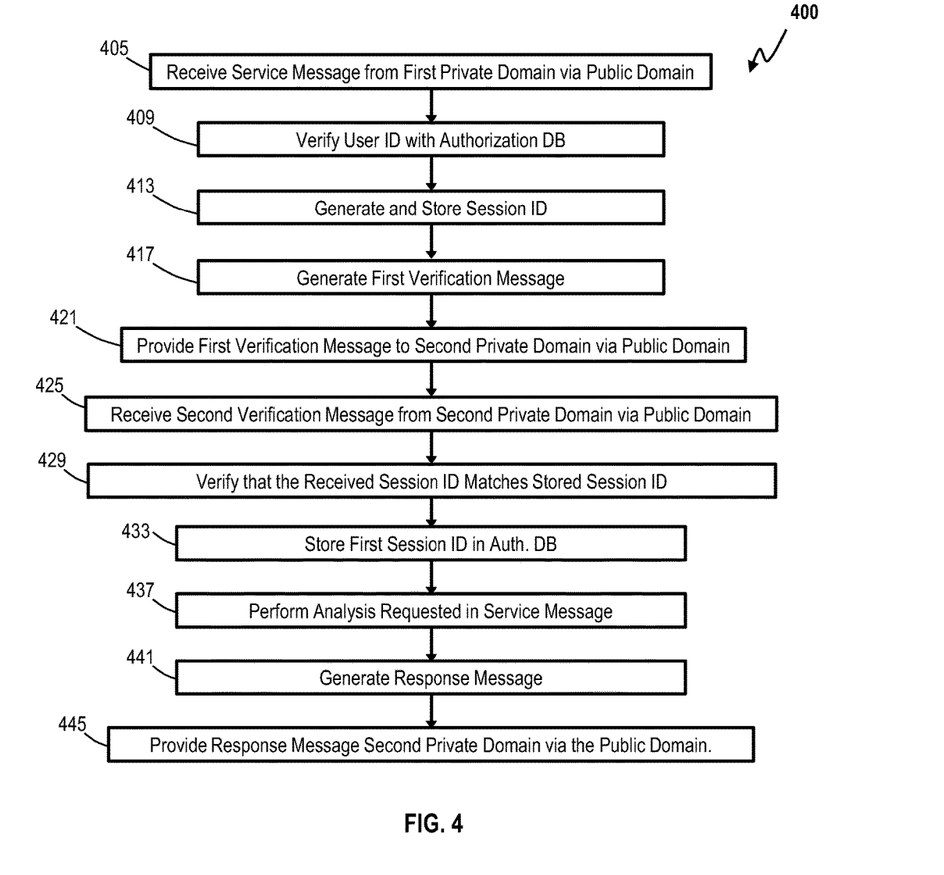
FIG. 4 illustrates a flow diagram of an exemplary process in accordance with aspects of the present disclosure.

FIG. 4 illustrates a flow diagram of an exemplary process 400 that may be performed by remote private domain (e.g., private domain 15) in accordance with aspects of the present disclosure. At 405 a computing device (e.g., computing device 200 executing authorization service 61) in a first private domain (e.g., private domain 15) of a computing network (e.g., environment 10) receives a service message from a second private domain (e.g., private domain 13) for an analytic service (e.g., analytic services 65) in the first private domain. For example, the service message may be received through a firewall (e.g., firewall 21) of the second private domain via a gateway exposed by the first private domain. In accordance with aspects of the present disclosure, the service message can include a user ID, a security ID, and first session ID generated by the second private domain, as previously detailed herein. The service message can also include other information, such as that previously described herein (e.g., company information) as previously described herein.

At 409 the computing device verifies the user ID received at 405 by comparing received user ID to a user ID for a previously identified user of the second private domain. For example, as described previously user authorization and/or access control information can be pre-stored in the authorization database (e.g., authorization database 69) in the first private domain. At 413, based on a successful verification at 409, the computing device generates a second session ID. At 417, the computing device generates a first verification message including the user ID, the security ID, the first session ID received at 405, and the second session ID generated at 413. Additionally, in embodiments, the first verification message can identify the entity operating the first private domain and the entity operating the second private domain. Further, the first verification message can include a timestamp indicating a time at which it was created.

At 421, the computing device provides the first verification message to the second private domain via the public domain. At 425, in response to the first verification message sent at 421, the computing device receives a second verification message from the second private domain via the public domain. The second verification message can include the user ID, the security ID, the first session ID, and the second session ID. Additionally, in embodiments, the first verification can identify the entity operating the first private domain and the entity operating the second private domain.

At 429 the computing device verifies that the second verification message at 425 by comparing the received session ID with the session ID stored at 413. Additionally, the computing device can determine whether the timestamp received in the second verification message is within a predefined period of the current time. At 433, after successfully verifying the second session ID at 429, the computing device stores the first session ID in the authorization database for future reference when authorizing subsequent service messages received from the second private domain. Thus, subsequent service messages from the analytic services in second private domain that include the user ID and session ID can be directly executed by the analytic services in first private domain without repeating the authentication and authorization process (e.g., FIG. (101)-(123)). At 437, after successfully verifying the second session ID at 429, the computing device performs the analysis (e.g., job) requested in the service message received at 405 using the job information received at 405. At 441, the computing device generates a response message including the results of the job performed at 437 and the first session ID. At 445, the computing device provides the response message to the first private domain via the public domain.

Figure 5:
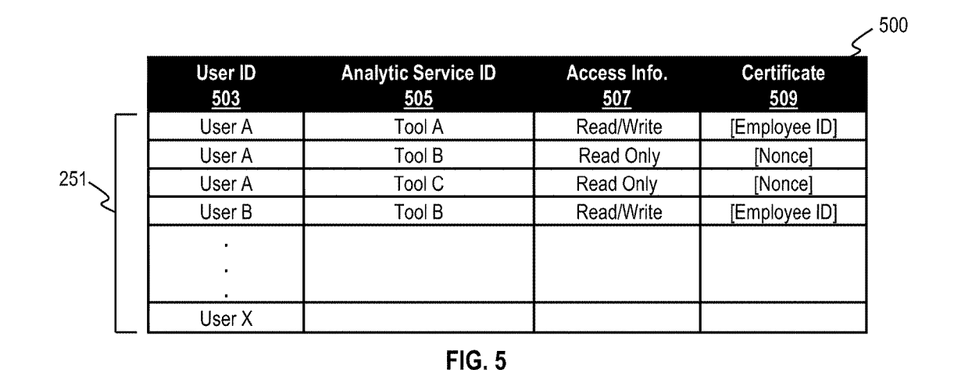
FIG. 5 illustrates a data structure for exemplary access control records in accordance with aspects of the present disclosure.

FIG. 5 illustrates a data structure 500 for exemplary access control records 251 in accordance with aspects of the present disclosure. The access control records 251 can be the same at those previously discussed herein. In embodiments, each of access control records associates a user ID 503 with an analytic services ID 505 (e.g., analytic services 45 and 65) and access control information 507. The user ID 503 can be an identifier of user (e.g., an employee number) that is globally unique within an information system (e.g., environment 10). The analytic service ID 505 can be an identifier of a respective analytic service (e.g., analytic services 45, 65) that is globally unique within the information system. The access information 507 can be a rule associated with particular user ID 503 and analytic service ID 505 that specifies a level or type of access the user has been granted with respect to a particular analytic service. For example, the access information 507 can specify that a particular user (e.g., User A) has read and/or write access to a particular analytic service (e.g., Tool A). The access information 507 can include other information, such as a time frame in which a user is permitted access to an analytic service. Additionally, the access information 507 can include information limiting the attributes, information, and/or algorithms the analytic service can access based on access rights of the user.

Figure 6:
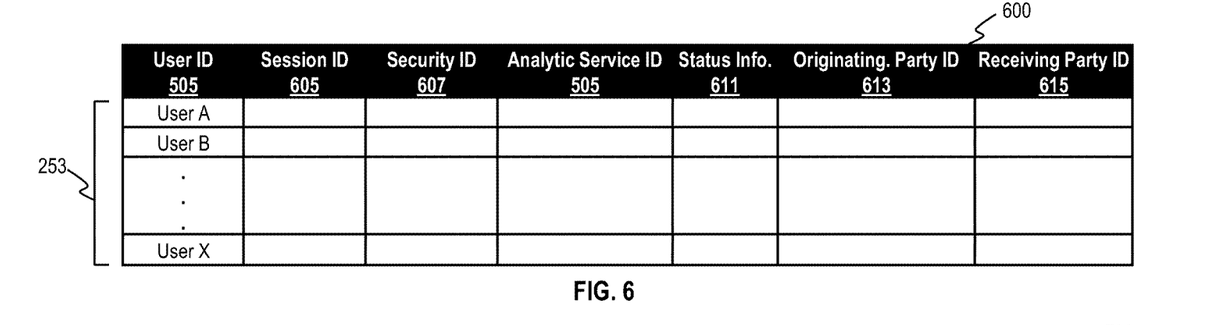
FIG. 6 illustrates a data structure for exemplary session control records in accordance with aspects of the present disclosure.

FIG. 6 illustrates a data structure 600 for exemplary session control records 253 in accordance with aspects of the present disclosure. The session control records 253 can be the same as those previously described herein. In embodiments, each of the session control records 253 can associate a user ID 503 with a session ID 605, a security ID 607, status information 611, and an originating party ID 613 and/or a receiving party ID 615, which can be the same or similar to those previously described herein. For example, the session ID 605 can be an identifier of a session (e.g., an instance of analytic services 45, 65) within the information system (e.g., environment 10). The security ID 607 can be a unique token (e.g., an encrypted nonce, or encrypted user ID) that can be used to verify the user ID 503. In the data structure 600, the analytic service ID 505 can indicate one or more analytic services (e.g., analytic services 45, 65) in association with the respective user ID 505 and/or the session ID 605. The status information 611 can indicate the status of a current session, as previously discussed herein. For example, the status information 611 can indicate that a particular session is active, waiting, or terminated. The originating party ID 613 and the receiving party ID 615, which may identify the parties the originated an service message (e.g., the operator of private domain 13) and the party receiving the service message (e.g., the operator of private domain 15

Figure 7:
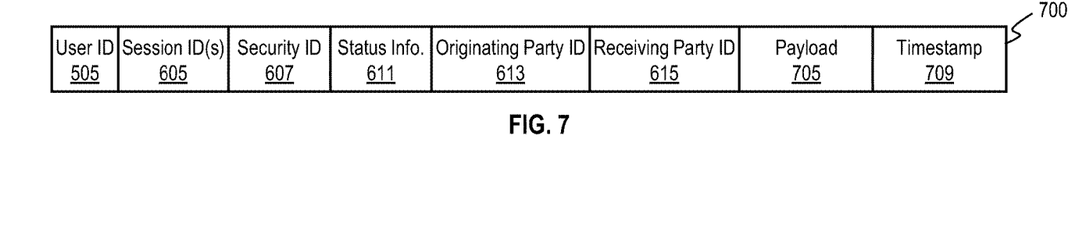
FIG. 7 illustrates a data structure for exemplary messages in accordance with aspects of the present disclosure.

FIG. 7 illustrates a data structure 700 for an exemplary message in accordance with aspects of the present disclosure. The service message represented by the data structure 700 can be the same as the service calls, service messages, authentication messages, and the response messages previously described herein. In embodiments, the data structure 700 can include a user ID 505, session IDs 605, security ID 607, an analytic service ID, and status information 611, which can be the same as those described above. Additionally, the data structure 700 can include the originating ID 613 and/or the receiving party ID 615. Further, the data structure 700 can include a payload 705, which can be, fore example, job information, or job result data, as described previously herein. Also, the data structure 700 can include a timestamp 709, which indicates a time at which the data structure 700 was created, as previously described herein.

As detailed above, implementations of the embodiments disclosed above enhance the operation of disturbed computing networks by providing for mutual, symmetrical verification of private domains across a public domain. Additionally, once verified, the implementations of the embodiments disclosed above do not require the private domains to maintain continuous communication links. Rather, while a session is active, information can be asynchronously exchanged between remote services in the private domains, which is advantageous for long-running analysis jobs.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. For example, while FIG. 1 illustrates only two private domains, it is understood that some embodiments can include three or more private domains with one or more users that are authenticated and authorized in each of the private domains. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   authenticating a user, by a computing device in a first private domain of an information network, by validating authentication information provided by the user when logging into the first private domain;
   generating, by the computing device based on successfully validating the authentication information provided by the user when logging into the first private domain, a user identifier ("ID") for the user;
   providing, by the computing device, the user ID identifier ("ID") to the user;
   providing to the user, by the computing device, a first session ID;
   receiving from the user, by the computing device, a service call for a first analytic service residing in the first private domain, the service call including the user ID and the first session ID;
   verifying, by the computing device, the first session ID received in the service call;
   verifying, by the computing device, the user ID received in the service call;
   providing, by the computing device, via a public domain of the information network, a service message for a second analytic service residing in a second private domain of the information network, the service message including the user ID, the first session ID, and job information for the second analytic service;
   receiving, by the computing device, via the public domain, a first verification message from the second private domain, the first verification message including the user ID, the first session ID, and a second session ID;
   validating, by the computing device, the user ID and the first session ID included in the first verification message;
   providing, by the computing device, via the public domain, a second verification message, the second verification message including the user ID, the first session ID, and the second session ID; and
   receiving, by the computing device, via the public domain, a response message from the second private domain, the response message including information determined by the second analytic service based on the job information in the service message.

2. The method of claim 1, further comprising determining that the user is authorized comprises: receiving the user ID from the user; forwarding the user ID received from the user to an authentication proxy; and receiving a message from the authentication proxy that the user has been authenticated.

3. The method of claim 1, further comprising storing the first session ID in an authorization database.

4. The method of claim 3, wherein: the verifying the first session ID received in the service call comprise comparing the first session ID received with the service call with the first session ID stored in the authorization database; and the verifying the user ID comprises comparing the user ID and a security ID received with the service call with the user ID and a security ID stored in the authorization database.

5. The method of claim 4, further comprising determining that the first session ID is active based on the first session ID stored in the authorization database.

6. The method of claim 1, wherein the providing the second verification message comprises providing the second verification message in a thread that is separate from the service message and the first verification message.

7. The method of claim 1, wherein the service call comprises a first Simple Object Access Protocol ("SOAP") envelope and includes the user ID, a security ID, the first session ID, an identifier of an operator of the first private domain, an identifier of an operator of the second private domain and information for the second analytics service.

8. The method of claim 7, wherein the service message comprises a second SOAP envelope and includes the user ID, the security ID, the first session ID, the second session ID, the identifier of the operator of the first private domain and the identifier of the operator of the second private domain.

9. The method of claim 8, wherein the first verification message comprises a third SOAP envelope and includes the user ID, the security ID, the first session ID, the second session ID, the identifier of the operator of the first private domain, and the identifier of the operator of the second private domain.

10. A system comprising:
a processor;
a computer-readable hardware storage device;
program instructions stored on the computer-readable hardware storage device for execution by the processor that controls the system to perform operations comprising:
authenticating a user of a first private domain of an information network by validating authentication information provided by the user when logging into the first private domain;
generating, based on successfully validating the authentication information provided by the user when logging into the first private domain, a user identifier ("ID") for the user;
providing the user ID identifier ("ID") and a first session ID to the user;
receiving from the user a service call for a first analytic service residing in the first private domain, the service call including the user ID and the first session ID;
verifying the user ID and the first session ID received in the service call;
providing via a public domain of the information network, a service message for a second analytic service residing in a second private domain of the information network, the service message including the user ID, the first session ID, and job information for the second analytic service;
receiving via the public domain, a first verification message from the second private domain, the service message including the user ID, the first session ID, and a second session ID;
validating that the user ID and the first session ID included in the first verification message matches the user ID and the first session ID provided to the user;
providing via the public domain, a second verification message, the second verification message including the user ID, the first session ID, and the second session ID; and
receiving via the public domain, a response message from the second private domain, the response message including information determined by the second analytic service based on the job information in the service message.

11. The system of claim 10, further comprising determining that the user is authorized by: receiving the user ID from the user; forwarding the user ID received from the user to an authentication proxy; and receiving a message from the authentication proxy that the user has been authenticated.

12. The system of claim 11, wherein the providing the user ID comprises authenticating the user of the first private domain using the authentication proxy.

13. The system of claim 10, wherein the providing to the user the first session ID comprises: determining that the user is authorized to access the first analytic service using access control information pre-stored in an authorization database; and storing the user ID and the first session ID in the authorization database.

14. The system of claim 13, wherein the verifying the user ID and the first session ID received in the service call comprises: verifying that the first session ID is active by comparing the first session ID received with the service call with the first session ID stored in the authorization database; and verifying that the user is authorized to use the analytic services by comparing the user ID received with the service call with the user ID stored in the authorization database.

15. The system of claim 13, wherein the determining that the first session ID included in the first verification message matches the first session ID provided to the user further comprises determining that the first session ID is active based on the first session ID stored in the authorization database.

16. The system of claim 10, wherein the providing the second verification message comprises providing the second verification message in a thread that is separate from the service message and the first verification message.

17. The system of claim 10, wherein the service call, the service message, the first verification message, and the second verification message comprises a first Simple Object Access Protocol ("SOAP") envelopes.

18. A method comprising:
receiving, by a computing device residing in a first private domain of an information network, via a public domain of the information network, a service message for a first analytic service residing in the first private domain of the information network, the service message including a user identifier ("ID"), a first session ID, and job information for the first analytic service;
verifying, by the computing device, the user ID by comparing the user ID to an authenticated user ID pre-stored in the first private domain, wherein the authenticated user ID indicates successful validation of user authentication information provided by the user when
logging into the first private domain; generating, by the computing device, a second session ID;
providing, by the computing device, via the public domain, a first verification message from a second private domain, the service message including the user ID, the first session ID, and the second session ID;
receiving, by the computing device, via the public domain of the information network, a second verification message, the second verification message including the user ID, the first session ID, and the second session ID; and
verifying, by the computing device, that the second session ID received in the second verification message matches the second session ID; storing, by the computing device, the first session ID;
performing, by the computing device, a second analytic service using the job information received in the service message; and
providing, by the computing device, via the public domain, a response message from the first private domain, the response message including information determined by the second analytic service based on the job information in the service message.

19. The method of claim 18, wherein: the storing the first session ID comprises storing the first session ID in the authorization database.

20. The method of claim 18, wherein the service message the first verification message, and the second verification message comprise Simple Object Access Protocol ("SOAP") envelopes.

21. The method of claim 1, wherein the first analytic service comprises an instance of a software tool requested or executed by the user.

22. The method of claim 1, further comprising determining whether the user can access the first analytic service based on the validating the first session ID.

23. The method of claim 1, wherein the first analytic service and the second analytic service model or simulate a system under test.

* * * * *